US012584062B2

(12) United States Patent
Solairaj et al.

(10) Patent No.: US 12,584,062 B2
(45) Date of Patent: Mar. 24, 2026

(54) METHOD FOR STIMULATING INJECTION WELLS USING REDUCING AGENTS

(71) Applicant: JGS RESOURCES, LLC, Sugar Land, TX (US)

(72) Inventors: Sriram Solairaj, Sugar Land, TX (US); Gary Arnold Pope, Cedar Park, TX (US)

(73) Assignee: JGS RESOURCES, LLC, Sugar Land, TX (US)

( * ) Notice: Subject to any disclaimer, the term of this patent is extended or adjusted under 35 U.S.C. 154(b) by 0 days.

(21) Appl. No.: 18/766,096

(22) Filed: Jul. 8, 2024

(65) Prior Publication Data

US 2025/0011642 A1 Jan. 9, 2025

Related U.S. Application Data

(60) Provisional application No. 63/512,174, filed on Jul. 6, 2023.

(51) Int. Cl.
| | |
|---|---|
| *C09K 8/588* | (2006.01) |
| *C09K 8/592* | (2006.01) |
| *C09K 8/594* | (2006.01) |
| *C09K 8/68* | (2006.01) |
| *E21B 43/16* | (2006.01) |

(52) U.S. Cl.
CPC .............. *C09K 8/588* (2013.01); *C09K 8/592* (2013.01); *C09K 8/594* (2013.01); *C09K 8/68* (2013.01); *E21B 43/16* (2013.01)

(58) Field of Classification Search
CPC ....................................................... E21B 43/16
See application file for complete search history.

(56) References Cited

U.S. PATENT DOCUMENTS

| | | | | |
|---|---|---|---|---|
| 4,434,852 A | * | 3/1984 | Morel | ................... E21B 43/168 |
| | | | | 166/268 |
| 2016/0032170 A1 | * | 2/2016 | Li | ........................... C09K 8/588 |
| | | | | 166/305.1 |
| 2020/0291221 A1 | * | 9/2020 | Lin | ......................... C08L 33/10 |
| 2021/0171821 A1 | * | 6/2021 | Miralles | ................. C09K 8/584 |
| 2022/0081495 A1 | * | 3/2022 | Dugonjic-Bilic | ........ C09K 8/36 |
| 2024/0384159 A1 | * | 11/2024 | Favero | ..................... C09K 8/68 |

* cited by examiner

*Primary Examiner* — William D Hutton, Jr.
*Assistant Examiner* — Avi T Skaist
(74) *Attorney, Agent, or Firm* — Meunier Carlin & Curfman LLC

(57) ABSTRACT

Described herein are methods and systems for increasing the injectivity of wells used to inject water or water containing various chemicals such as water-soluble polymers for the purpose of increasing the recovery of hydrocarbons such as crude oil from a hydrocarbon-bearing formation. Injectivity often decreases because of adverse reactions or plugging at or near the wellbore. The treatment procedure involves injecting reducing agents (e.g., sulfite or metabisulfite salts) dissolved in water or water containing other chemicals such as polymers.

20 Claims, 3 Drawing Sheets

METHOD FOR STIMULATING INJECTION WELLS USING REDUCING AGENTS

CROSS-REFERENCE TO RELATED APPLICATIONS

This application claims benefit of priority of U.S. Provisional Application No. 63/512,174, filed Jul. 6, 2023, which is incorporated herein by reference in its entirety.

BACKGROUND

Water or water containing various chemicals such as water-soluble polymers is injected into wells to displace oil towards production wells. Various methods to improve oil recovery from subsurface formations are known as water-flooding, polymer flooding, chemical flooding and so forth. High injection rates are favorable for each of these methods. Adding polymers to the water to increase the viscosity of the water results in a more efficient displacement of the oil, especially for viscous or heavy crude oils, and is now common practice in the oilfield. However, the injection rate will generally be lower when the viscosity of the injected fluid increases. Furthermore, the polymer injection rates tend to decrease with time, especially if the water quality is poor. Iron in the water can crosslink the polymer to form gels that plug the oil formation, and this problem is aggravated by dirty water containing solids or oil droplets. Degradation of the polymer is another common problem. The stability of the polymer depends on factors such as the oxidation state of the water, iron dissolved in the water, and temperature among several other factors. Degradation of the polymer reduces its viscosity, which results in reduced oil recovery, or the need to use more polymer. The negative impact on chemical flooding methods such as surfactant-polymer flooding is even greater and may cause complete failure. Clearly there is a need to solve these well-known problems related to improved oil recovery.

SUMMARY

Described herein are methods for improving recovery of crude oil from subsurface geological formations containing hydrocarbons. The methods can comprise injecting an aqueous injection fluid (e.g., water or brine) into a well that is completed in the oil-bearing formation. Polymer may be added to the water to increase the viscosity of the water for the purpose of more efficiently or completely displacing the oil to production wells. The injection rate into a well has been found to increase when a reducing agent (e.g., sodium metabisulfite) is added to the injected aqueous fluid. The addition of the reducing agent (e.g., sodium metabisulfite) to the water has also been found to prevent degradation of the polymer caused by oxidation of ferrous ions to ferric ions.

Accordingly, provided herein are methods for increasing the injectivity of an aqueous injection fluid to improve oil recovery from a hydrocarbon-bearing formation. These methods can comprise introducing a sulfite or metabisulfite salt into an aqueous injection fluid; and injecting the aqueous injection fluid through a wellbore and into the hydrocarbon-bearing formation.

In some embodiments, the sulfite or metabisulfite salt can comprise sodium metabisulfite, potassium metabisulfite, ammonium metabisulfite, sodium sulfite, potassium sulfite, ammonium sulfite, or a combination thereof. In certain embodiments, the sulfite or metabisulfite salt can comprise sodium metabisulfite (SMBS).

In some embodiments, the sulfite or metabisulfite salt is dissolved in the aqueous injection fluid at a concentration of 10 ppm to 500,000 ppm, such as a concentration of 1000 to 100,000 ppm, 10 to 1000 ppm, or 100 to 500 ppm.

In some embodiments, the aqueous injection fluid further comprises a polymer. For example, the polymer can comprise hydrolyzed polyacrylamide, copolymers of acrylamide and acrylic acid, copolymers such as copolymers of acrylamide and 2-acrylamide-2-methylpropane sulfonic acid, and terpolymers such as terpolymers of acrylamide, acrylic acid and 2-acrylamide-2-methylpropane sulfonic acid, copolymers thereof, and blends thereof. In certain embodiments, the polymer can comprise hydrolyzed polyacrylamide.

In some embodiments, the method further comprises combining the aqueous injection fluid comprising the sulfite or metabisulfite salt with a solid polymer powder. In other embodiments, the method further comprises the aqueous injection fluid comprising the sulfite or metabisulfite salt with an emulsion polymer.

Optionally in some embodiments, the method further comprises introducing one or more additional components into the aqueous injection fluid. The one or more additional components can comprise, for example, chelating agents, salts, surfactants, solvents, alkali and mobility control agents, biocides, corrosion inhibitors, a miscible gas (e.g., $CO_2$), or any combination thereof.

In some embodiments, the method further comprises injecting a gas into the wellbore. The gas can be injected before or after the aqueous injection fluid (e.g., alternating injection of the aqueous injection fluid and the gas). Alternatively or in addition, the gas can be co-injected with the aqueous injection fluid. Examples of suitable gases include carbon dioxide, nitrogen, natural gas, or a combination thereof.

In some embodiments, the method further comprises heating the aqueous injection fluid to increase the temperature of the aqueous injection fluid prior to injecting the aqueous injection fluid through the wellbore and into the hydrocarbon-bearing formation.

In some embodiments, the method further comprises flushing one or more of the surface facilities, polymer skids, injection skids, fluid handling equipment, pipes, well tubing, and/or well casing with the aqueous injection fluid comprising the sulfite or metabisulfite salt before injecting the aqueous injection fluid through the wellbore and into the hydrocarbon-bearing formation.

In some embodiments, the hydrocarbon-bearing formation comprises a conventional formation. In other embodiments, the hydrocarbon-bearing formation comprises an unconventional formation.

In some embodiments, the wellbore comprises an injection wellbore, and the method further comprises producing fluids from a production wellbore spaced apart from the injection wellbore and in fluid communication with the hydrocarbon-bearing formation. In some of these embodiments, the method further comprises flushing one or more of the surface facilities, polymer skids, injection skids, fluid handling equipment, pipes, well tubing, and/or well casing with the aqueous injection fluid comprising the sulfite or metabisulfite salt before producing fluids from a production wellbore.

In other embodiments, the method can comprise producing fluids from the wellbore.

In some embodiments, the hydrocarbon-bearing formation comprises heavy oil (e.g., heavy oil that interacts with oxidized iron).

In some embodiments, injecting the aqueous injection fluid through the wellbore and into the hydrocarbon-bearing formation comprises fracturing the hydrocarbon-bearing formation.

Also provided herein are methods of preparing an aqueous injection fluid for use in oil and gas operations. These methods can comprise dissolving or dispersing a polymer in an aqueous fluid comprising a sulfite or metabisulfite salt.

In some embodiments, the sulfite or metabisulfite salt can comprise sodium metabisulfite, potassium metabisulfite, ammonium metabisulfite, sodium sulfite, potassium sulfite, ammonium sulfite, or a combination thereof. In certain embodiments, the sulfite or metabisulfite salt can comprise sodium metabisulfite (SMBS).

In some embodiments, the polymer comprises hydrolyzed polyacrylamide, copolymers of acrylamide and acrylic acid, copolymers such as copolymers of acrylamide and 2-acrylamide-2-methylpropane sulfonic acid, and terpolymers such as terpolymers of acrylamide, acrylic acid and 2-acrylamide-2-methylpropane sulfonic acid, copolymers thereof, and blends thereof. In certain embodiments, the polymer comprises hydrolyzed polyacrylamide.

In some embodiments, the sulfite or metabisulfite salt is dissolved in the aqueous fluid at a concentration of 10 ppm to 500,000 ppm, such as a concentration of 1000 to 100,000 ppm, 10 to 1000 ppm, or 100 to 500 ppm.

Also provided herein are methods of recycling a produced brine in an oil and gas operation. These methods can comprise contacting the produced brine with a sulfite or metabisulfite salt, thereby facilitating separation of oil emulsified or suspended in the produced brine from the produced brine. Subsequently, the produced brine can be utilized as an aqueous fluid for the production of an aqueous injection fluid. For example, optionally one or more additional treatment In some of these embodiments, the oil can comprise a heavy oil that interacts with oxidized iron.

In some embodiments, the sulfite or metabisulfite salt can comprise sodium metabisulfite, potassium metabisulfite, ammonium metabisulfite, sodium sulfite, potassium sulfite, ammonium sulfite, or a combination thereof. In certain embodiments, the sulfite or metabisulfite salt can comprise sodium metabisulfite (SMBS).

Also provided herein are methods for improving the viscosity of an aqueous injection fluid comprising a polymer. These methods can comprise contacting the aqueous injection fluid comprising a polymer dissolved or dispersed in the aqueous injection fluid with a sulfite or metabisulfite salt.

In some embodiments, the sulfite or metabisulfite salt can comprise sodium metabisulfite, potassium metabisulfite, ammonium metabisulfite, sodium sulfite, potassium sulfite, ammonium sulfite, or a combination thereof. In certain embodiments, the sulfite or metabisulfite salt can comprise sodium metabisulfite (SMBS).

In some embodiments, the polymer comprises hydrolyzed polyacrylamide, copolymers of acrylamide and acrylic acid, copolymers such as copolymers of acrylamide and 2-acrylamide-2-methylpropane sulfonic acid, and terpolymers such as terpolymers of acrylamide, acrylic acid and 2-acrylamide-2-methylpropane sulfonic acid, copolymers thereof, and blends thereof. In certain embodiments, the polymer comprises hydrolyzed polyacrylamide.

In some embodiments, the sulfite or metabisulfite salt is dissolved in the aqueous fluid at a concentration of 10 ppm to 500,000 ppm, such as a concentration of 1000 to 100,000 ppm, 10 to 1000 ppm, or 100 to 500 ppm.

BRIEF DESCRIPTION OF THE DRAWINGS

The accompanying figures, which are incorporated in and constitute a part of this specification, illustrate several aspects described below.

DESCRIPTION

Figure 1:
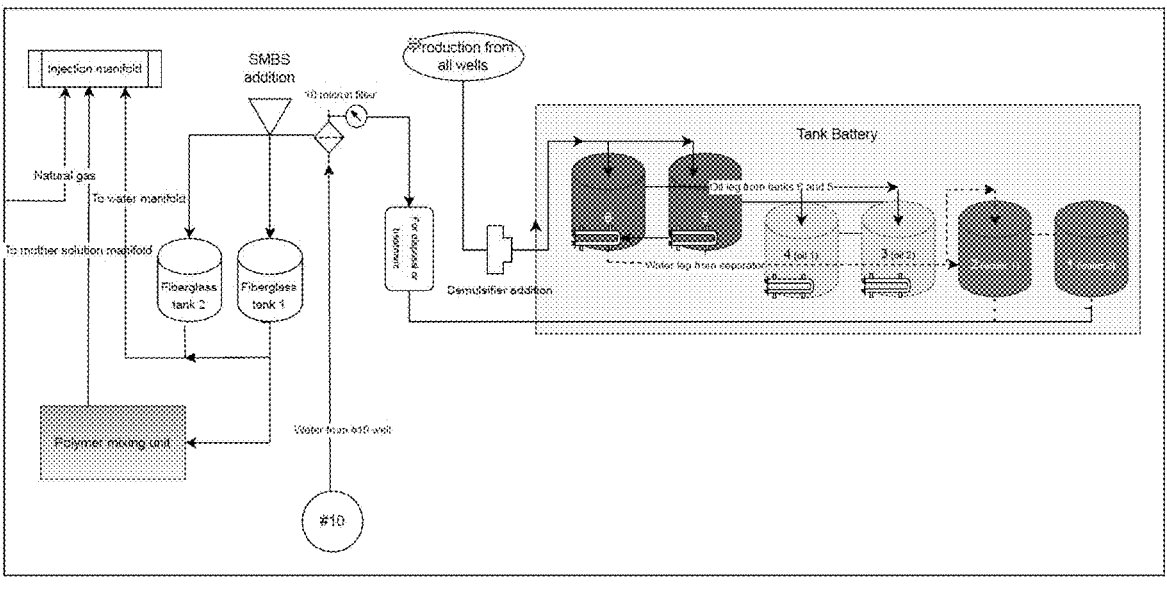
FIG. 1 schematically illustrates representative surface facilities used for performing a polymer flood.

The present disclosure relates to compositions and methods for use in various oil and gas operations. Reference will now be made in detail to the embodiments of the invention, examples of which are illustrated in the description, examples, and drawings described below. This invention may, however, be embodied in many different forms and should not be construed as limited to the embodiments set forth herein.

Unless otherwise defined, all technical and scientific terms used herein have the same meaning as commonly understood to one of ordinary skill in the art to which the invention belongs. The following definitions are provided for the full understanding of terms used in this specification.

Definitions

The following terms will be used throughout the specification and will have the following meanings unless otherwise indicated.

Hydrocarbon: The terms "hydrocarbon" or "hydrocarbonaceous" or "petroleum" or "crudes" or "oil" (and variants) may be used interchangeably to refer to carbonaceous material originating from subterranean formations as well as synthetic hydrocarbon products, including organic liquids or gases, kerogen, bitumen, crude oil, natural gas or from biological processes, that is principally hydrogen and carbon, with significantly smaller amounts (if any) of heteroatoms such as nitrogen, oxygen and sulfur, and, in some cases, also containing small amounts of metals. Crude oil (e.g., liquid petroleum) and natural gas (e.g., gaseous petroleum) are both hydrocarbons.

Crude oils or unrefined petroleums are named according to their contents and origins, and are classified according to their per unit weight (specific gravity). Heavier crudes generally yield more heat upon burning, but have lower gravity as defined by the American Petroleum Institute (API) (i.e. API gravity) and market price in comparison to light (or sweet) crude oils. Crude oil may also be characterized by its Equivalent Alkane Carbon Number (EACN). The term "API gravity" refers to the measure of how heavy or light a petroleum liquid is compared to water. If an oil's API gravity is greater than 10, it is lighter and floats on water, whereas if it is less than 10, it is heavier and sinks. API gravity is thus an inverse measure of the relative density of a petroleum liquid and the density of water. API gravity may also be used to compare the relative densities of petroleum liquids. For example, if one petroleum liquid floats on another and is therefore less dense, it has a greater API gravity.

Heavy Oil: The terms "heavy oil" or "heavy hydrocarbons," as used herein refer to viscous hydrocarbon substances. Heavy hydrocarbons may comprise highly viscous hydrocarbons such as heavy oil, extra heavy oil, bitumen, tar, petcoke, asphaltenes and/or asphalt. Heavy oils and extra heavy oils are highly viscous with a density close to or even exceeding water. The phrase "heavy oil" as used herein also includes "extra heavy oil." Heavy hydrocarbons may comprise moderate to high quantities of paraffins, resins and asphaltenes, as well as smaller concentrations of sulfur, oxygen, and nitrogen. Heavy hydrocarbons may also include aromatics or other complex ring hydrocarbons. Additional elements, e.g., metals, may also be present in heavy hydrocarbons in trace amounts. Heavy hydrocarbons may be classified by API gravity. Heavy hydrocarbons generally have an API gravity below about 20° or lower. Heavy oil, for example, generally has an API gravity of about 10-20°, whereas extra heavy oil generally has an API gravity below about 12°. The viscosity of heavy hydrocarbons is generally greater than about 200 cp at reservoir conditions, and that of extra heavy oil is generally about 10,000 cp or more. (For reference, as used herein, "light oil" or "light hydrocarbons" have an API gravity above 20°, preferably above about 25°, even more preferably above 30° to 31°, and a viscosity of about 1 to 100 cp).

Hydrocarbon-bearing formation: The terms "hydrocarbon-bearing formation" or "formation" may be used interchangeably and refer to the hydrocarbon bearing reservoir rock matrix in which at least one wellbore (e.g., an injection wellbore) is present. For example, a formation refers to a body of hydrocarbon bearing reservoir rock that is sufficiently distinctive and continuous such that it can be mapped. It should be appreciated that while the term "formation" generally refers to geologic formations of interest, that the term "formation," as used herein, may, in some instances, include any reservoirs, geologic points, or volumes of interest (such as a survey area). The term formation is not limited to any structure and configuration described herein. The term formation may be used synonymously with the term reservoir.

Wellbore: The term "wellbore" refers to a single hole drilled into the formation for use in hydrocarbon recovery. The wellbore can be used for injection, production, or both. The wellbore may include casing, liner, tubing, other items, or any combination thereof. Casing is typically cemented into the wellbore with the cement placed in the annulus between the formation and the outside of the casing. Tubing and liners are typically not cemented in the wellbore. The wellbore may include an openhole portion or uncased portion. The wellbore is surrounded by the formation. The wellbore may be vertical, inclined, horizontal, or combination trajectories. The wellbore may include any completion hardware that is not discussed separately. The term wellbore is not limited to any structure and configuration described herein. The term wellbore may be used synonymously with the terms borehole or well. For simplicity, a "production wellbore" enables the removal of fluids from the formation to the surface and an "injection wellbore" enables the placement of fluid into the formation from the surface.

Enhanced oil recovery: The term "enhanced oil recovery" refers to techniques for increasing the amount of hydrocarbons (e.g., oil, gas, a mixture of oil and gas, etc.) that may be extracted from a hydrocarbon-bearing formation. Enhanced oil recovery may also be referred to as improved oil recovery or tertiary oil recovery (as opposed to primary and secondary oil recovery). Regardless of the alternative terminology, examples of EOR include, for example, (a) miscible gas injection (which includes, for example, carbon dioxide flooding), (b) chemical injection (sometimes referred to as chemical enhanced oil recovery (CEOR), and which includes, for example, polymer flooding, alkaline flooding, surfactant flooding, conformance control operations, as well any combination thereof such as alkaline-polymer flooding, surfactant-polymer flooding, or alkaline-surfactant-polymer flooding), (c) microbial injection, (d) thermal recovery (which includes, for example, cyclic steam, steam flooding, and fire flooding), and (e) co-solvent-alkaline polymer flooding. In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof. The terms "operation" or "application" or "treatment" may be used interchangeability herein, as in an EOR operation or an EOR application or an EOR treatment.

Compositions and Methods

Described herein are compositions methods for improving recovery of crude oil from subsurface geological formations containing hydrocarbons. The methods can comprise injecting an aqueous injection fluid (e.g., water or brine) into a well that is completed in the oil-bearing formation. Polymer may be added to the water to increase the viscosity of the water for the purpose of more efficiently or completely displacing the oil to production wells. The injection rate into a well has been found to increase when a reducing agent (e.g., sodium metabisulfite) is added to the injected aqueous fluid. The addition of the reducing agent (e.g., sodium metabisulfite) to the water has also been found to prevent degradation of the polymer caused by oxidation of ferrous ions to ferric ions.

Accordingly, provided herein are methods for increasing the injectivity of an aqueous injection fluid to improve oil recovery from a hydrocarbon-bearing formation. These methods can comprise introducing a sulfite or metabisulfite salt into an aqueous injection fluid; and injecting the aqueous injection fluid through a wellbore and into the hydrocarbon-bearing formation.

The term "aqueous injection fluid" refers to a fluid that will be injected into a formation, for example, via a wellbore, such as an injection wellbore. The injection fluid may include a brine or aqueous phase, but it may also include gas, such as a mixture of brine and gas. The brine may be practically any liquid that may be injected into a hydrocarbon-bearing formation. The brine may be surface water, water recovered from a production wellbore, sea water, produced formation brine, formation brine, fresh water, produced water, water, saltwater, synthetic brine, synthetic seawater brine, or any combination thereof. In some embodiments, brines may include, but are not necessarily limited to, heavy brines, monovalent brines, divalent brines, and trivalent brines that comprise soluble salts like sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, any derivative thereof, or any combination thereof.

In some embodiments, the sulfite or metabisulfite salt can comprise sodium metabisulfite, potassium metabisulfite, ammonium metabisulfite, sodium sulfite, potassium sulfite, ammonium sulfite, or a combination thereof. In certain embodiments, the sulfite or metabisulfite salt can comprise sodium metabisulfite (SMBS).

In some embodiments, the sulfite or metabisulfite salt is dissolved in the aqueous injection fluid at a concentration of 10 ppm to 500,000 ppm, such as a concentration of 1000 to 100,000 ppm, 10 to 1000 ppm, or 100 to 500 ppm.

In some embodiments, the aqueous injection fluid may include at least one polymer, which may be practically any polymer that may be injected into a hydrocarbon-bearing formation. The injection fluid can be mixed on-site to include the polymer, e.g., by mixing the polymer in the form of a powder, gel, emulsion, or liquid, with a solute such as water.

Depending on the specific embodiment, the "polymer" may be a polymer composition, a polymer solution, a polymer suspension, polymer dispersion, a liquid polymer, etc. In short, the "polymer" itself may be made up of various constituents. In some embodiments, the polymer can be a component of the injection fluid. Besides the polymer and the brine of the injection fluid, the injection fluid may include at least one other component (e.g., at least one solvent, at least one optional additive, etc.) in some embodiments. This other component may also be a constituent of the polymer, for example, a solvent in the form of a surfactant may be a constituent of the polymer. The other component may also be mixed on-site.

Of note, the aqueous injection fluid may not contain a polymer in some embodiments. Indeed, the aqueous injection fluid (comprising the sulfite or metabisulfite salt) may contain a surfactant only in one embodiment; produced water only in a second embodiment; an alkali only in a third embodiment; so on.

As discussed above, the term "polymer" refers to practically any polymer that may be injected into a hydrocarbon-bearing formation. For example, the polymer can be initially provided as a powder that is mixed on-site, or the polymer can be initially provided in a partial-strength solution, such as gel, emulsion, or other fluid that is made up partly of polymer (e.g., 2%-60% polymer) in a solute such as water or a brine as discussed hereinabove. As discussed herein, the injection fluid can be mixed on-site to include the polymer, e.g., by mixing the polymer in the form of a powder, gel, emulsion, or liquid, with a solute such as water.

Regarding the polymer, a powder polymer may be selected or tailored according to the characteristics of the formation for EOR treatment such as permeability, temperature, and salinity. Examples of suitable powder polymers include biopolymers such as polysaccharides. For example, polysaccharides can be xanthan gum, scleroglucan, guar gum, schizophyllan, any derivative thereof (e.g., such as a modified chain), or any combination thereof. Indeed, the terminology "mixtures thereof" or "combinations thereof" can include "modifications thereof" herein. Examples of suitable powder synthetic polymers include polyacrylamides and polyethylene oxide. Examples of suitable powder polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the powder synthetic polymer comprises polyacrylic acid (PAA). In one embodiment, the powder synthetic polymer comprises polyvinyl alcohol (PVA). Copolymers may be made of any combination or mixture above, for example, a combination of NVP and ATBS. Thus, examples of suitable powder polymers include biopolymers or synthetic polymers. Examples of suitable powder polymers can also include any mixture of these powder polymers (including any modifications of these powder polymers).

In one embodiment, the powder polymer is an anionic polyacrylamide having a charge ranging from 0 to about 40%, which may be resultant because the reaction to form polyacrylamide generally starts with about 0% to about 40% acrylic acid or acid salt. The polymer that may be formed with acrylic acid or an acid salt monomer is called anionic polyacrylamide because the polymer itself contains a negative charge, which is balanced by a cation, usually sodium. A polymer made with little or no acid or acid salt is considered nonionic polyacrylamide because the polymer essentially contains no charge. The powder polymer has an average molecular weights (Mw) of: 0.5 to 30 Million Daltons in one embodiment; from 1 to 15 Million Daltons in a second embodiment; at least 2 Million Daltons in a third embodiment; from 4 to 25 Million Daltons in a fourth embodiment; less than or equal to 25 Million Daltons in a fifth embodiment; and at least 0.5 Million Daltons in a sixth embodiment.

The polymer powders have an average particle size of at least 5 mesh in one embodiment, 10-100 mesh in a second embodiment, and 40-400 mesh in a third embodiment. The polymer powder undergoes an additional milling, grinding, or crushing prior to mixing with the water-soluble solvent in the preparation, for a particle size of 1-1000 μm in one embodiment; from 10-500 μm in a second embodiment; at least 5 μm in a third embodiment; and from 20-500 μm in a fourth embodiment.

In some embodiments, the polymer can comprise hydrolyzed polyacrylamide, copolymers of acrylamide and acrylic acid, copolymers such as copolymers of acrylamide and 2-acrylamide-2-methylpropane sulfonic acid, and terpolymers such as terpolymers of acrylamide, acrylic acid and 2-acrylamide-2-methylpropane sulfonic acid, copolymers thereof, and blends thereof. In certain embodiments, the polymer can comprise hydrolyzed polyacrylamide.

In some embodiments, the method further comprises combining the aqueous injection fluid comprising the sulfite or metabisulfite salt with a solid polymer powder. In other embodiments, the method further comprises the aqueous injection fluid comprising the sulfite or metabisulfite salt with an emulsion polymer.

In some embodiments, the aqueous injection fluid can comprise slickwater. "Slickwater," as used herein, refers to water-based injection fluid comprising a friction reducer which is typically pumped at high rates to fracture a reservoir. Optionally when employing slickwater, smaller sized proppant particles (e.g., 40/70 or 50/140 mesh size) are used due to the fluid having a relatively low viscosity (and therefore a diminished ability to transport sizable proppants relative to more viscous fluids). In some embodiments, proppants are added to some stages of completion/stimulation during production of an unconventional reservoir. In some embodiments, slickwater is injected with a small quantity of proppant.

In some embodiments, the aqueous injection fluid can comprise smart water. Smart water flooding through tailoring of injection water salinity and ionic composition has been used to improve oil recovery in carbonate reservoirs. "Smart water" generally refers to water used for a water flooding process in which the ion composition of the water has been modified to improve wetting properties of the oil reservoir and enhance fluid flow and oil recovery in a porous medium during production. Surface and intermolecular forces, thin-film dynamics, and capillary and adhesion forces at rock-fluid interfaces impact crude oil liberation from pores. Stability and rigidity of oil-water interfaces influence the destabilization of interfacial films to promote coalescence between released oil droplets and contribute to recovery. As a result, oil recovery in smart water flooding is due at least in part to the combined effect of favorable interactions occurring at oil-brine interfaces and oil-brine-rock interfaces in formations. Accordingly, in some embodiments, the methods described herein can further comprise modifying the salinity of the aqueous injection fluid (e.g., increasing the salinity or decreasing the salinity of the aqueous injection fluid), for example, to improve wetting properties of the oil reservoir and enhance fluid flow and oil recovery in a porous medium during production.

Optionally in some embodiments, the method further comprises introducing one or more additional components into the aqueous injection fluid. The one or more additional components can comprise, for example, chelating agents, salts, surfactants, solvents, alkali and mobility control agents, biocides, corrosion inhibitors, a miscible gas (e.g., $CO_2$, $N_2$, natural gas, etc.), reducing agents/oxygen scavengers, stabilizers, or any combination thereof. In some embodiments, the one or more additional components can be present in the aqueous injection fluid in an amount of less than or equal to 10 wt. % (based on the total weight of the aqueous injection fluid).

Chelating agents include molecules that can coordinate metal ions in solution. Chelating agents can be used to prevent the precipitation of metal ions and/or to prevent hardness ions (e.g., divalent cations such as $Ca^{2+}$ and/or $mg^{2+}$) from precipitating surfactants present in the aqueous injection fluid. Examples of chelating agents include, for example, EDTA (ethylenediaminetetraacetic acid), EDTA sodium salt, and tetrasodium iminodisuccinate.

Example surfactants include organic materials with amphiphilic properties. Surfactants include classes of anionic, nonionic, cationic, and zwitterionic surfactants. Commercial surfactants produced worldwide on large scale commercial basis include soaps, linear alkylbenzine sulfonates, lignin sulfonates, fatty alcohol ethoxylates, and alkylphenol ethoxylates. Anionic and nonionic surfactants are particularly preferred for use in the aforementioned foam because these classes of surfactant are particularly amenable to foam formation use of inline injection, and such foams demonstrate enhanced stability under the conditions encountered in oil reservoirs.

Anionic surfactants include generally sulfates, sulfonates, phosphate esters, and carboxylate. Specific examples of anionic surfactants include ammonium lauryl sulfate, sodium lauryl sulfate or sodium dodecyl sulfate, sodium laureth sulfate or sodium lauryl ether sulfate, sodium myreth sulfate, dioctyl sodium sulfosuccinate, perfluorooctanesulfonate, perfluorobutanesulfonate, the alkyl-aryl ether phosphates, and the alkyl ether phosphates.

Nonionic surfactants include fatty alcohols, such as cetyl alcohol, stearyl alcohol, cetostearyl alcohol and oleyl alcohol. Other nonionic alcohols include, for example, polyoxyethylene glycol alkyl ethers, octaethylene glycol monodo-decyl ether, pentaethylene glycol mondodecyl ether, polyoxypropylene glycol alkyl ethers, glucoside alkyl ether, decyl glucoside, lauryl glucoside, octyl glucoside, polyoxyethylene glycol octylphenol ethers, polyoxyethylene glycol alkylphenol ethers, glycerol alkyl esters, glyceryl laurate, polyoxyethylene glycol sorbitan alkyl esters such as polysorbate, sorbitan alkyl esters, dodecyldimethylamine oxide, block copolymers of polyethylene glycol and polypropylene glycol such as poloxamers, and polyethoxylated tallow amine.

Solvents can include practically any solvent that may be injected into a hydrocarbon-bearing formation. In some embodiments, the solvent may be a water-soluble solvent. The water soluble solvent may be selected from one or more of surfactants (e.g., non-ionic surfactants), ethers (e.g., glycol ethers), alcohols, co-solvents, or any combination thereof, for an HLB of greater than or equal to 8 (e.g., at least 8) as measured by methods known in the art, e.g., NMR, gas-liquid chromatography, or invert emulsion experiments using Griffin's method or Davies's method. In one embodiment, the HLB is about 10.0 to about 20. In another embodiment, the HLB is less than or equal to 15. Examples of suitable water-soluble solvents can also include any mixture of these water-soluble solvents (including any modifications of these water soluble solvents). For example, the water-soluble solvent can include a mixture of non-ionic and anionic surfactants. The anionic surfactant can be present in an amount of less than or equal to 5 wt. % as a stabilizer.

Examples of suitable water-soluble solvents include but are not limited to alcohol ethoxylates (-EO-), alcohol alkoxylates (-PO-EO-), alkyl polyglycol ethers, alkyl phenoxy ethoxylates, an ethylene glycol butyl ether (EGBE), a diethylene glycol butyl ether (DGBE); a triethylene glycol butyl ether (TGBE), polyoxyethylene nonylphenylether, branched, or any combination thereof. In one embodiment, the water-soluble solvent comprises an alcohol, such as isopropyl alcohol (IPA), isobutyl alcohol (IBA), secondary butyl alcohol (SBA), or any combination thereof. In another embodiment, the water-soluble solvent comprises a low MW ether such as ethylene glycol monobutyl ether. In another embodiment, the solvent comprises monoethanol amine (MEA).

In embodiments with the use of HPAM type synthetic polymers, a non-ionic surfactant is used as the water-soluble solvent. In yet another embodiment, a mixture or combination of surfactants is used, e.g., non-ionic surfactants and anionic surfactants in a weight ratio ranging from 6:1 to 2:1. Examples of non-ionic surfactants for use as the water-soluble solvents comprise ethoxylated surfactants, nonylphenol ethoxylates or alcohol ethoxylate, other ethoxylated surfactants, or any combination thereof. In another embodiment, the anionic surfactants comprise internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy] sulfates, alkyl sulfonate, α-olefin sulfonates (AOS), dihexyl sulfosuccinate, or any combination thereof. In yet another embodiment, the water-soluble solvent comprises alkylpolyalkoxy sulfates as disclosed in U.S. Pat. No. 8,853,136, sulfonated amphoteric surfactants as disclosed in U.S. Pat. No. 8,714,247, surfactants based on anionic alkyl alkoxylates as disclosed in US Patent Publication No. 20140116689, or any combination thereof, each of which are incorporated herein by reference in its entirety.

In one embodiment, the water-soluble solvent comprises isopropyl alcohol (IPA), n-propyl alcohol, isobutyl alcohol (IBA), methyl-isobutyl alcohol, secondary butyl alcohol (SBA), ethylene glycol monobutyl ether, diethylene glycol monobutyl ether, triethylene glycol monobutyl ether, or any combination thereof. In one embodiment, the water soluble solvent comprises an ionic surfactant selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, α-olefin sulfonates (AOS), dihexyl sulfosuccinates, alkylpolyalkoxy sulfates, sulfonated amphoteric surfactants, or any combination thereof. Examples of suitable water-soluble solvents can also include any combination or mixture of these water-soluble solvents (including any modifications of these water-soluble solvents).

In one embodiment, the water-soluble solvent comprises a co-solvent, and the co-solvent comprises ionic surfactant, non-ionic surfactant, anionic surfactant, cationic surfactant, nonionic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, surfactants commonly used for enhanced oil recovery applications, alkyl aryl sulfonates (AAS), α-olefin sulfonates (AOS), internal olefin sulfonates (IOS), alcohol ether sulfates derived from propoxylated $C_{12}$-$C_{20}$ alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy] sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, or any combination thereof. Examples of suitable co-solvents can also include any mixture of these co-solvents (including any modifications of these co-solvents).

In some examples, the aqueous injection fluid can comprise monoethanol amine (MEA) and a metabisulfite salt, such as sodium metabisulfite.

In some embodiments, the method further comprises injecting a gas into the wellbore. The gas can be injected before or after the aqueous injection fluid (e.g., alternating injection of the aqueous injection fluid and the gas). Alternatively or in addition, the gas can be co-injected with the aqueous injection fluid. Examples of suitable gases include carbon dioxide, nitrogen, natural gas, or a combination thereof.

In some embodiments, the method further comprises heating the aqueous injection fluid to increase the temperature of the aqueous injection fluid prior to injecting the aqueous injection fluid through the wellbore and into the hydrocarbon-bearing formation.

In some embodiments, the method further comprises flushing one or more of the surface facilities, polymer skids, injection skids, fluid handling equipment, pipes, well tubing, and/or well casing with the aqueous injection fluid comprising the sulfite or metabisulfite salt before injecting the aqueous injection fluid through the wellbore and into the hydrocarbon-bearing formation.

In some embodiments, the hydrocarbon-bearing formation comprises a conventional formation. In other embodiments, the hydrocarbon-bearing formation comprises an unconventional formation.

In some embodiments, the method can comprise producing fluids from the wellbore.

In other embodiments, the wellbore comprises an injection wellbore, and the method further comprises producing fluids from a production wellbore spaced apart from the injection wellbore and in fluid communication with the hydrocarbon-bearing formation. In some of these embodiments, the method further comprises flushing one or more of the surface facilities, polymer skids, injection skids, fluid handling equipment, pipes, well tubing, and/or well casing with the aqueous injection fluid comprising the sulfite or metabisulfite salt before producing fluids from a production wellbore.

In some embodiments, the hydrocarbon-bearing formation comprises heavy oil (e.g., heavy oil that interacts with oxidized iron).

In some embodiments, injecting the aqueous injection fluid through the wellbore and into the hydrocarbon-bearing formation comprises fracturing the hydrocarbon-bearing formation. For example, in some embodiments, the aqueous injection fluid can be injected into the wellbore at a pressure and flow rate effective to fracture the hydrocarbon-bearing formation.

Also provided herein are methods of preparing an aqueous injection fluid for use in oil and gas operations. These methods can comprise dissolving or dispersing a polymer in an aqueous fluid comprising a sulfite or metabisulfite salt.

FIG. 1 is a simplified schematic of example surface facilities used for preparing such an aqueous injection fluid. As shown in this schematic, water is pumped from a supply well into fiber glass tanks. Part of the water in the fiber glass tanks is used to feed a polymer mixing unit and part of the water in the fiber glass tanks is used to dilute the concentrated polymer solution prepared in the polymer mixing before it is pumped into an injection well completed in the target formation. The concentrated polymer solution prepared in the polymer mixing unit is called a mother solution. Sodium metabisulfite (SMBS) is added to the water before the water is pumped into the fiber glass tanks. The polymer can be any suitable polymer used in oil and gas operations, as discussed above. In some examples, the polymer can comprise a copolymer of acrylamide and acrylic acid supplied as a solid powder. The polymer mixing unit can include a device to wet the dry polymer powder with water before entering hydration tanks where the wetted polymer is hydrated by stirring for a specified time, usually several hours, needed to fully dissolve the polymer in water. Ferrous ions are dissolved in the supply water taken from a shallow aquifer. When contacted with air, the ferrous ions are oxidized to ferric ions. This Fenton-type reaction causes polymer degradation and a reduction in viscosity of the hydrated polymer solution. SMBS reacts with the oxygen in the water so the Fenton-type reaction that causes the polymer degradation will not occur. The use of SMBS is a more effective method to prevent polymer degradation than either of the commonly used methods of a nitrogen blanket or aerating the water before wetting the polymer.

In some embodiments, the sulfite or metabisulfite salt can comprise sodium metabisulfite, potassium metabisulfite, ammonium metabisulfite, sodium sulfite, potassium sulfite, ammonium sulfite, or a combination thereof. In certain embodiments, the sulfite or metabisulfite salt can comprise sodium metabisulfite (SMBS).

In some embodiments, the polymer comprises hydrolyzed polyacrylamide, copolymers of acrylamide and acrylic acid, copolymers such as copolymers of acrylamide and 2-acrylamide-2-methylpropane sulfonic acid, and terpolymers such as terpolymers of acrylamide, acrylic acid and 2-acrylamide-2-methylpropane sulfonic acid, copolymers thereof, and blends thereof. In certain embodiments, the polymer comprises hydrolyzed polyacrylamide.

In some embodiments, the sulfite or metabisulfite salt is dissolved in the aqueous fluid at a concentration of 10 ppm to 500,000 ppm, such as a concentration of 1000 to 100,000 ppm, 10 to 1000 ppm, or 100 to 500 ppm.

Also provided herein are methods of recycling a produced brine in an oil and gas operation. These methods can comprise contacting the produced brine with a sulfite or metabisulfite salt, thereby facilitating separation of oil emulsified or suspended in the produced brine from the produced brine. Subsequently, the produced brine can be utilized as an aqueous fluid for the production of an aqueous injection fluid. For example, optionally one or more additional treatment In some of these embodiments, the oil can comprise a heavy oil that interacts with oxidized iron.

In some embodiments, the sulfite or metabisulfite salt can comprise sodium metabisulfite, potassium metabisulfite, ammonium metabisulfite, sodium sulfite, potassium sulfite, ammonium sulfite, or a combination thereof. In certain embodiments, the sulfite or metabisulfite salt can comprise sodium metabisulfite (SMBS).

Also provided herein are methods for improving the viscosity of an aqueous injection fluid comprising a polymer. These methods can comprise contacting the aqueous injection fluid comprising a polymer dissolved or dispersed in the aqueous injection fluid with a sulfite or metabisulfite salt.

In some embodiments, the sulfite or metabisulfite salt can comprise sodium metabisulfite, potassium metabisulfite, ammonium metabisulfite, sodium sulfite, potassium sulfite, ammonium sulfite, or a combination thereof. In certain embodiments, the sulfite or metabisulfite salt can comprise sodium metabisulfite (SMBS).

In some embodiments, the polymer comprises hydrolyzed polyacrylamide, copolymers of acrylamide and acrylic acid, copolymers such as copolymers of acrylamide and 2-acrylamide-2-methylpropane sulfonic acid, and terpolymers such as terpolymers of acrylamide, acrylic acid and 2-acrylamide-2-methylpropane sulfonic acid, copolymers thereof, and blends thereof. In certain embodiments, the polymer comprises hydrolyzed polyacrylamide.

In some embodiments, the sulfite or metabisulfite salt is dissolved in the aqueous fluid at a concentration of 10 ppm to 500,000 ppm, such as a concentration of 1000 to 100,000 ppm, 10 to 1000 ppm, or 100 to 500 ppm.

EXAMPLES

The following examples are set forth below to illustrate the compositions, methods, and results according to the disclosed subject matter. These examples are not intended to be inclusive of all aspects of the subject matter disclosed herein, but rather to illustrate representative compositions, methods, and results. These examples are not intended to exclude equivalents and variations of the present invention which are apparent to one skilled in the art.

Example 1. Injectivity Improvement

Figure 2:
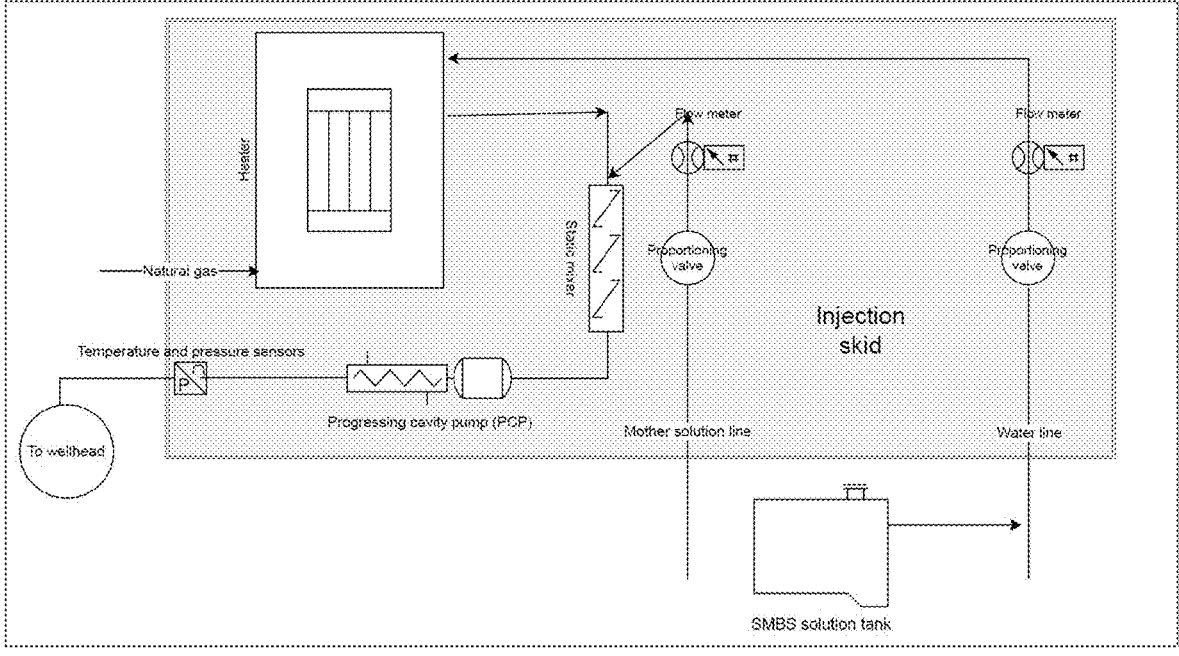
FIG. 2 schematically illustrates representative surface facilities used for SMBS injection for a well stimulation.

In this example, 40,000 ppm SMBS was dissolved in feed water and injected using the injection skid for injection well I1. A schematic of the SMBS injection for stimulation treatment is shown in FIG. 2. The purpose of this application was to stimulate the well before resuming polymer injection. Approximately 1000 ppm of a commercial copolymer with a molecular weight of about 20 million had been injected into well I1 for several months before the stimulation treatment using SMBS.

Figure 3:
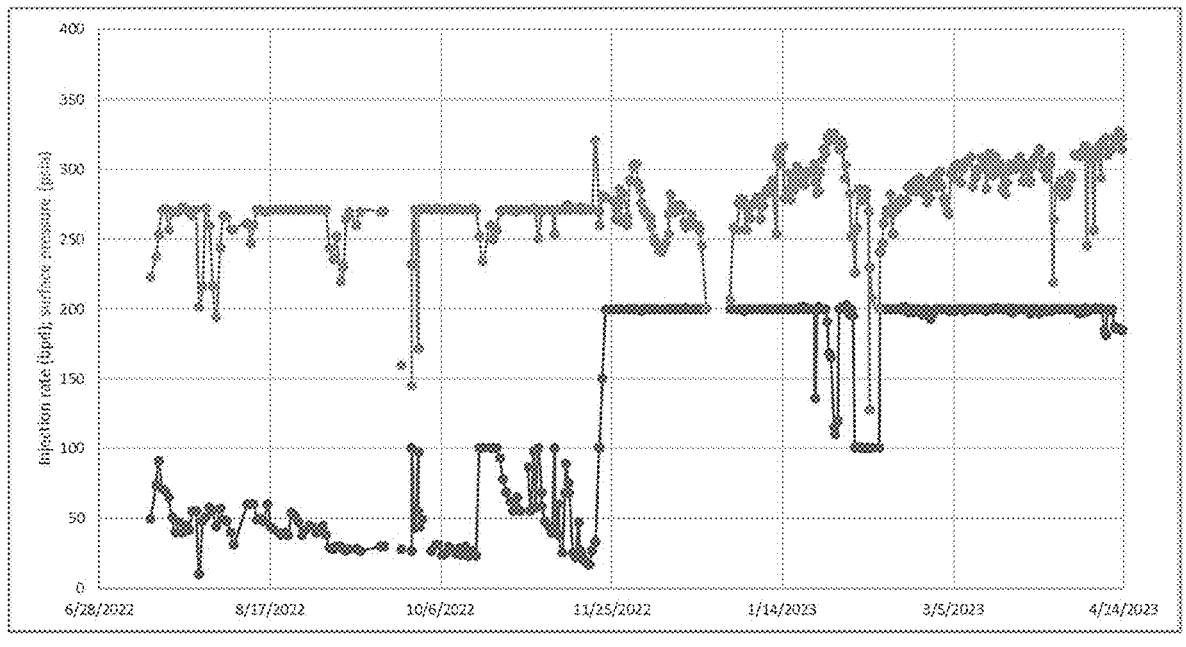
FIG. 3 is a plot showing injection rate data for I1 showing an increase in rate of nearly 7-fold following treatment with SMBS.

As shown in FIG. 3, the polymer injection rate before stimulation with SMBS was low and had been decreasing with time. The injection rate was lower than expected for the polymer solution based on wellhead samples with a viscosity of about 25 cp. The cause of the low injectivity was formation damage due to injecting untreated water.

The first stimulation treatment was performed and the well was shut-in overnight to allow time for the SMBS to react downhole (a soak period). A second treatment was conducted in the same well at the same concentration approximately two weeks later. Combining the first and the second treatment a total of ~18 bbl of the 4% solution was injected.

Approximately one month following the first stimulation treatment, a low concentration of SMBS was added to the water feeding the polymer mixing unit (see FIG. 1). As shown in FIG. 3, the polymer injection rate approximately two months following the first stimulation treatment increased from about 30 barrels per day before treatment to 200 barrels per day after treatment, a remarkable increase of about 7-fold.

Figure 4:
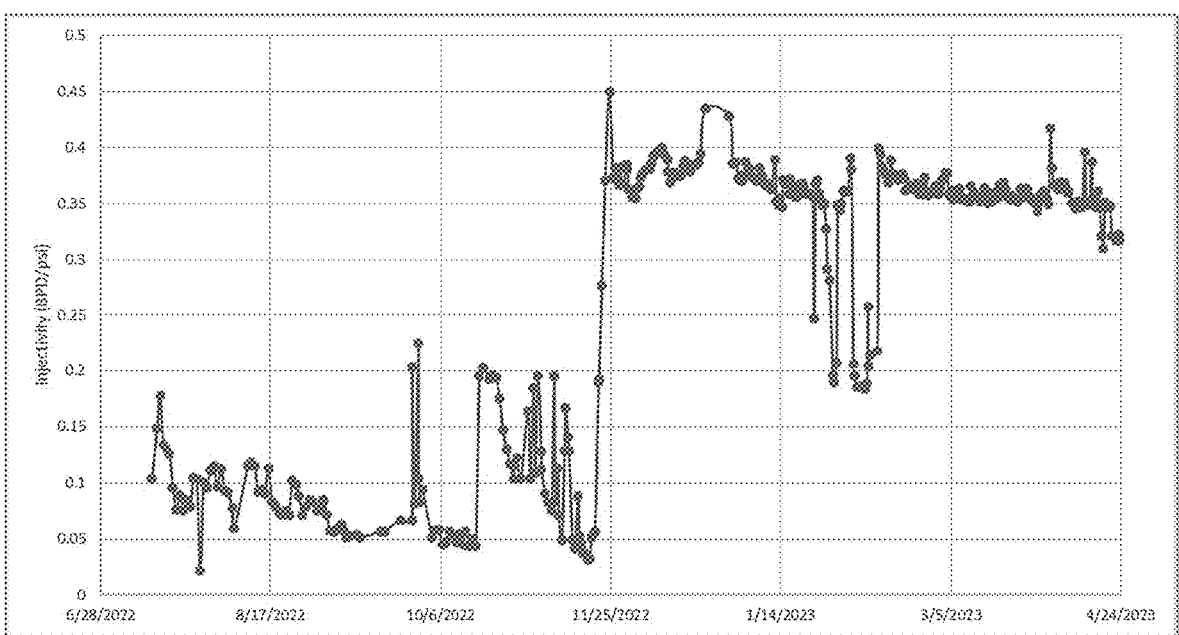
FIG. 4 shows an injectivity (BPD/psi) plot for injection well I1, showing a ~7-fold increase following treatment with SMBS.

Another way to present the data is to plot injectivity as a ratio of barrels per day divided by the bottom hole pressure (FIG. 4). Furthermore, the polymer viscosity increased from about 26 cp to about 53 cp when SMBS was added upstream of the polymer mixing unit, so the increase in the injection rate is even more dramatic accounting for the increased viscosity of the injected polymer solution.

Figure 5:
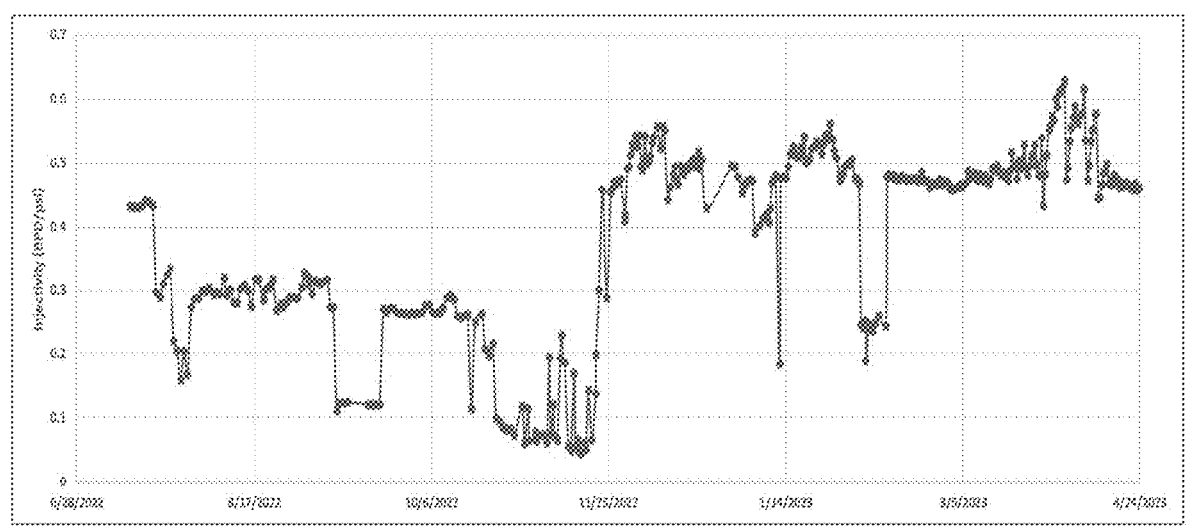
FIG. 5 is a plot showing the injectivity (BPD/psi) of injection well I2. An approximately 5-fold increase in injectivity was observed after SMBS treatment.

Following the highly successful first trial, SMBS was used to stimulate polymer injection well I2. Polymer injection into well I2 started at the same time as well I1 and a similar decline in injectivity was observed. As shown in FIG. 5, the injectivity of 1000 ppm polymer increased about 5-fold following the SMBS treatment of well I2.

Example 2. Viscosity Improvement

This example illustrates the improvement in polymer viscosity for both the mother solution (4000 ppm) and diluted polymer solution (1000 ppm) used for the ongoing polymer flood. The table below shows the polymer viscosity approximately doubled after adding SMBS upstream of the polymer mixing unit. As shown in the table below, treatment with SMBS improved the polymer viscosity for both the mother solution (4000 ppm) and diluted polymer solution (1000 ppm).

| Time Period | SMBS concentration (ppm) | Average mother solution viscosity (cP) | Average diluted polymer viscosity (cP) | Comments |
|---|---|---|---|---|
| Months 0-2 | 0 | 373 | 26.0 | Diluted viscosity half of expected value (55 cP) |
| Months 3-5 | 250 | 508 | 53.0 | Polymer viscosity consistently high and within target |

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compounds, components, compositions, and method steps disclosed herein are specifically described, other combinations of the compounds, components, compositions, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for increasing the injectivity of an aqueous injection fluid to improve oil recovery from a hydrocarbon-bearing formation, the method comprising:
   introducing a sulfite or metabisulfite salt into an aqueous injection fluid; and
   injecting the aqueous injection fluid through a wellbore and into the hydrocarbon-bearing formation;
   wherein the sulfite or metabisulfite is dissolved in the aqueous injection fluid in an effective amount to increase an injection rate of the aqueous injection fluid into the hydrocarbon-bearing formation, prevent degradation of a polymer present in the aqueous injection fluid, or a combination thereof,
   wherein the effective amount is at a concentration of from greater than 1,000 ppm to 500,000 ppm.

2. The method of claim 1, wherein the sulfite or metabisulfite salt comprises sodium metabisulfite, potassium metabisulfite, ammonium metabisulfite, sodium sulfite, potassium sulfite, ammonium sulfite, or a combination thereof.

3. The method of claim 1, wherein the aqueous injection fluid further comprises a polymer.

4. The method of claim 3, wherein the polymer comprises hydrolyzed polyacrylamide, copolymers of acrylamide and acrylic acid, copolymers such as copolymers of acrylamide and 2-acrylamide-2-methylpropane sulfonic acid, and terpolymers such as terpolymers of acrylamide, acrylic acid and 2-acrylamide-2-methylpropane sulfonic acid, copolymers thereof, and blends thereof.

5. The method of claim 1, wherein the method further comprises combining the aqueous injection fluid comprising the sulfite or metabisulfite salt with a solid polymer powder.

6. The method of claim 1, wherein the method further comprises the aqueous injection fluid comprising the sulfite or metabisulfite salt with an emulsion polymer.

7. The method of claim 1, wherein the sulfite or metabisulfite salt is dissolved in the aqueous injection fluid at a concentration of from greater than 1,000 ppm to 100,000 ppm.

8. The method of claim 1, further comprising introducing one or more additional components into the aqueous injection fluid.

9. The method of claim 8, wherein the one or more additional components comprise chelating agents, salts, surfactants, solvents, alkali and mobility control agents, biocides, corrosion inhibitors, a miscible gas, or any combination thereof.

10. The method of claim 1, wherein the method further comprises heating the aqueous injection fluid to increase the temperature of the aqueous injection fluid prior to injecting the aqueous injection fluid through the wellbore and into the hydrocarbon-bearing formation.

11. The method of claim 1, wherein the method further comprises flushing one or more of the surface facilities, polymer skids, injection skids, fluid handling equipment, pipes, well tubing, and/or well casing with the aqueous injection fluid comprising the sulfite or metabisulfite salt before injecting the aqueous injection fluid through the wellbore and into the hydrocarbon-bearing formation.

12. The method of claim 1, wherein the wellbore comprises an injection wellbore, and wherein the method further comprises producing fluids from a production wellbore spaced apart from the injection wellbore and in fluid communication with the hydrocarbon-bearing formation.

13. The method of claim 12, wherein the method further comprises flushing one or more of the surface facilities, polymer skids, injection skids, fluid handling equipment, pipes, well tubing, and/or well casing with the aqueous injection fluid comprising the sulfite or metabisulfite salt before producing fluids from a production wellbore.

14. The method of claim 1, wherein the method further comprises injecting a gas into the wellbore.

15. The method of claim 14, wherein the gas is injected before or after the aqueous injection fluid.

16. The method of claim 14, wherein the gas is co-injected with the aqueous injection fluid.

17. The method of claim 14, wherein the gas comprises carbon dioxide, nitrogen, natural gas, or a combination thereof.

18. The method of claim 1, wherein injecting the aqueous injection fluid through the wellbore and into the hydrocarbon-bearing formation comprises fracturing the hydrocarbon-bearing formation.

19. The method of claim 1, wherein the sulfite or metabisulfite salt is dissolved in the aqueous injection fluid at a concentration of from 40,000 ppm to 500,000 ppm.

20. The method of claim 1, wherein the sulfite or metabisulfite salt is dissolved in the aqueous injection fluid at a concentration of from 100,000 ppm to 500,000 ppm.

\* \* \* \* \*